US006722926B2

United States Patent
Chevassus-More

(10) Patent No.: US 6,722,926 B2
(45) Date of Patent: Apr. 20, 2004

(54) BUS BAR

(75) Inventor: Alain Chevassus-More, Touillon et Loutelet (FR)

(73) Assignee: FCI, Paris (FR)

( * ) Notice: Subject to any disclaimer, the term of this patent is extended or adjusted under 35 U.S.C. 154(b) by 0 days.

(21) Appl. No.: 10/212,552

(22) Filed: Aug. 5, 2002

(65) Prior Publication Data

US 2003/0032338 A1 Feb. 13, 2003

(30) Foreign Application Priority Data

Aug. 8, 2001 (FR) ............................................. 01 10674

(51) Int. Cl.[7] ................................................. H01R 9/22
(52) U.S. Cl. .......................................... 439/721; 439/839
(58) Field of Search ................................. 439/721, 709, 439/723, 724, 839, 857; 4/856

(56) References Cited

U.S. PATENT DOCUMENTS 3,880,494 A * 4/1975 Reed et al. .................. 439/517
4,283,108 A * 8/1981 Fischer ........................ 439/721

FOREIGN PATENT DOCUMENTS

| DE | 3335047 A1 | 4/1985 |
| EP | 0814551 A1 | 12/1997 |
| EP | 0872922 A2 | 10/1998 |

* cited by examiner

Primary Examiner—Hien Vu
Assistant Examiner—James R. Harvey
(74) Attorney, Agent, or Firm—Perman & Green, LLP

(57) ABSTRACT

The invention concerns a bus bar (1) laterally equipped with flat tabs (2) formed in one piece of the comb type, with connector plug sockets (3), the connector plug sockets (3) having at least one pair of elastic arms (4) destined to receive a supplementary contact and an applicator spring (5). The bus bar (1) with flat tabs (2) is made from two layers (1a, 1b), each arm (4a, 4b) of the said pair of elastic arms being formed in one piece onto each layer of the bus bar.

9 Claims, 5 Drawing Sheets

BUS BAR

BACKGROUND OF THE INVENTION

1. Field of the Invention

The invention concerns a bus bar laterally equipped with flat tabs formed in one piece, of the comb type having connector plug sockets, the connector plug sockets having at least one pair of elastic arms, which receive a supplementary contact and an applicator spring. Such bus bars are used, in particular, in the installation of electrical power networks through which pass currents of an intensity of the order of up to 100 A, under a voltage of some hundreds of volts. The invention is applied everywhere where electrical power energy of up to 100A per contact must be distributed.

2. Brief Description of Related Developments

A bus bar of this type is, according to the preamble, in known from, for example, patent application EP 814 551 A1. In such bus bars, when the line serves for the passage of high intensity currents of up to several amperes, the problem arises of very strong heating up of the bus bar if a current of that order is passed into a plate formed of one layer. If these bus bars are placed in switching boxes, this can easily lead to undesirable overheating in the said switching boxes.

To pass higher current intensities, the bus bar can be connected to other electrically conducting layers, which are fixed to the bus bar. This, however, complicates the manufacture of the bus bar, owing to the fact that the additional layers must be fixed to the bus bar.

SUMMARY OF THE INVENTION

The purpose of the present invention is that of providing a bus bar, which only undergoes slight heating up, even when high current intensities pass through it and which is of a simple design and therefore easy to manufacture.

The problem is solved by the fact that the bus bar with flat tabs is made from two layers and that one of the arms of the said pair of elastic arms is formed in one piece onto each layer of the bus bar. Thanks to this two-layer construction of the bus bar, the section serving for the passage of electricity is of double size and is able to pass higher current intensities of up to 100 amperes, without attracting a high degree of heating up of the bus bar. Also, the assembly of the bus bar with connector plug sockets is facilitated. Until to the present, in order to pass higher intensities through a multi-layer construction of the bus bar, it was necessary to provide rivets in order to interconnect the multi-layer bus bar, but in the present invention, the multi-layer bus bar is assembled solely by the action of the applicator spring. The assembly of rivets or similar fixing devices is not absolutely essential.

According to a preferred form of embodiment, the two flat tabs of a plug connector socket together form a bottom plate of the connector plug socket. This bottom plate has the advantage of having a double thickness in opposition to the bus bar in the preamble. For this reason, it is possible to better pass currents from the connector plug socket to the bus bar.

The two elastic arms of the said pair of elastic arms are preferably inclined towards one another on emerging from the bottom plate and then continuing by drawing aside in the form of a funnel. Moreover, the applicator spring customarily has a number of elastic arms equal to the number of pairs of elastic arms. The applicator spring brings together the ends, which continue in the form of a funnel, by pressing them together with the pairs of elastic arms and thus increases the normal strength of contact applied a blade contact inserted into the connector plug socket.

According to a preferred form of embodiment, the applicator spring has a connection plate equipped with lugs, with the help of which the two flat tabs of a connector plug socket are interconnected and with the help of which the applicator spring is connected to the pair of elastic arms. Thanks to these applicator spring lugs the bus bar is connected to two layers.

Moreover, one of the two contact bus bars has on the outside of the connector plug socket, lugs with the help of which the two layers of the bus bar are interconnected. In order to secure a better connection between the two layers, it is possible to make a rigid connection outside the lugs of the applicator spring by means of the lugs which are provided on the edge of one of the bus bar layers and come into contact with the edge of the second bus bar layer.

Preferably, the two layers of the bus bar are arranged substantially in parallel. For that reason, the two flat tabs, which constitute the bottom plate of the connector plug socket, come into contact with one another over a large surface, facilitating the passage of current between the two layers of the bus bar.

Preferably, the two layers of the bus bar are interconnected without brasing and/or welding. As already stated earlier, the connection between the two layers is principally made by the applicator spring, which holds together the two contact arms of a connector plug socket placed against one another and are formed in one piece onto the two different layers of the bus bar.

According to another form of embodiment of the bus bar according to the invention, the two layers of the bus bar can be interconnected by means of an adhesive plate, arranged between the two layers. This adhesive plate is sticky on the upper face and the lower face. This adhesive plate is not usually conductive, whilst the two layers of the bus bar are at the same potential. This is the result, firstly of the fact that the inserted blade contact comes into contact with the two pairs of elastic arms, each belonging to a different layer of the bus bar and secondly of the fact that the plates can be interconnected in an electrically conducting manner by means of rivets, or a common supply at the ends opposite the conductors, providing simultaneous distribution to the two plates, the current distributing itself in a balanced manner in the two plates.

The invention will be explained in greater detail with the help of the description of embodiment examples and referring to the appended drawings. In the drawings:

DETAILED DESCRIPTION OF THE PREFERRED EMBODIMENT(S)

Figure 1:
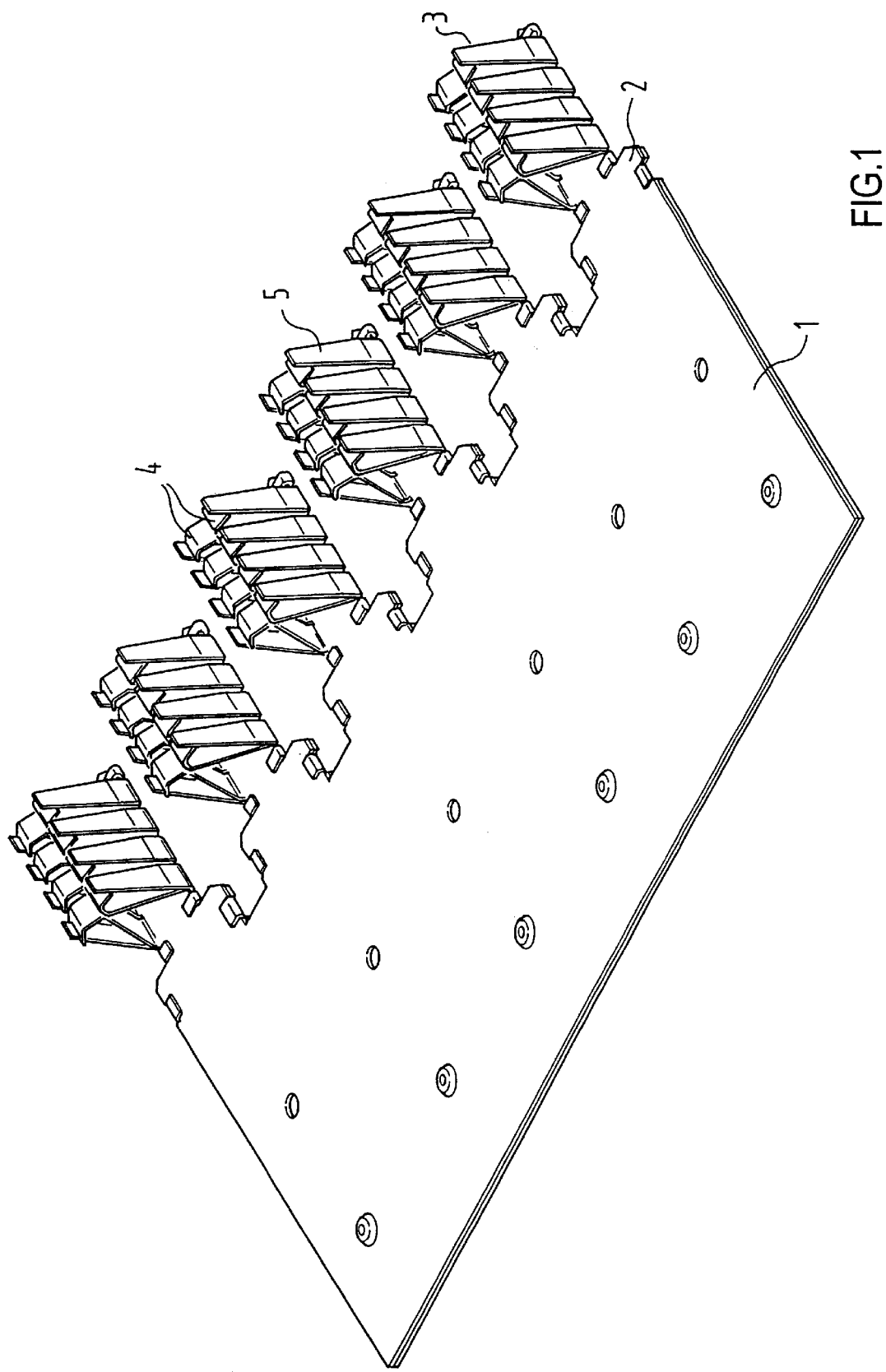
FIG. 1 shows a perspective view of a first form of embodiment of a bus bar according to the invention, equipped with a connector plug socket.

FIG. 1 shows the bus bar 1, which has at one of its ends flat tabs 2 parallel to one another on which are connector plug sockets 3. In the present example of an embodiment, this connector plug socket 3 is constituted of four pairs of elastic arms 4 placed next to one another and are held together by an applicator spring 5, the said applicator spring having a number of elastic arms equal to the number of interior elastic arms provided.

Figure 2:
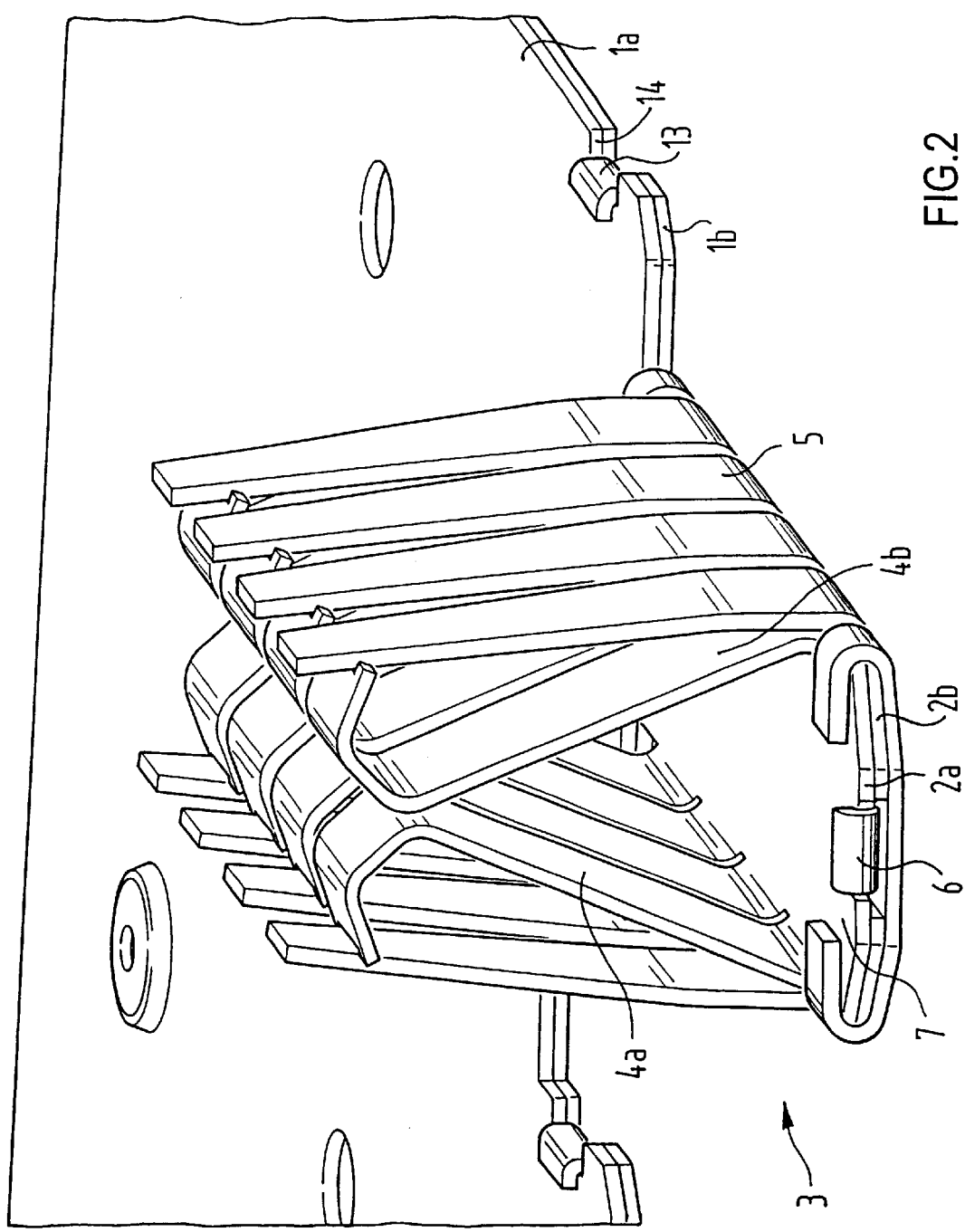
FIG. 2 shows an elevation view of the detail of connector plug sockets with elastic arms and the applicator spring in a detailed view.

As can be seen from FIG. 2, the connector plug socket 3 is constituted of several elastic arms 4a (four in the present case), placed next to one another, which are formed in one piece onto the upper flat tab 2a of the upper layer of the bus bar 1. Opposite are placed four elastic arms 4b formed in one piece onto the lower flat tab 2b of the lower layer 1b of the bus bar 1. The lower flat tab 2b can then be fixed to the upper flat tab 2a by means of a crimped component 6.

The two layers 1a and 1b of the bus bar 1 can also be interconnected by means of a lug 13 fixed on the lower layer 1b and engage in a notch 14 made in the upper layer 1a.

The elastic arms 4a and 4b extend from a bottom plate 7 formed by the two flat tabs 2a and 2b, inclined towards one another, observing the direction opposite to the direction of the plugging of a blade contact (not shown) and continuing in the form of a funnel on the level of their upper end. The ends of the elastic arms 4a and 4b are brought together by the pressure of the applicator spring 5, ensuring a more secure contact of a blade contact (not shown) with the pair of elastic arms 4.

Figure 3:
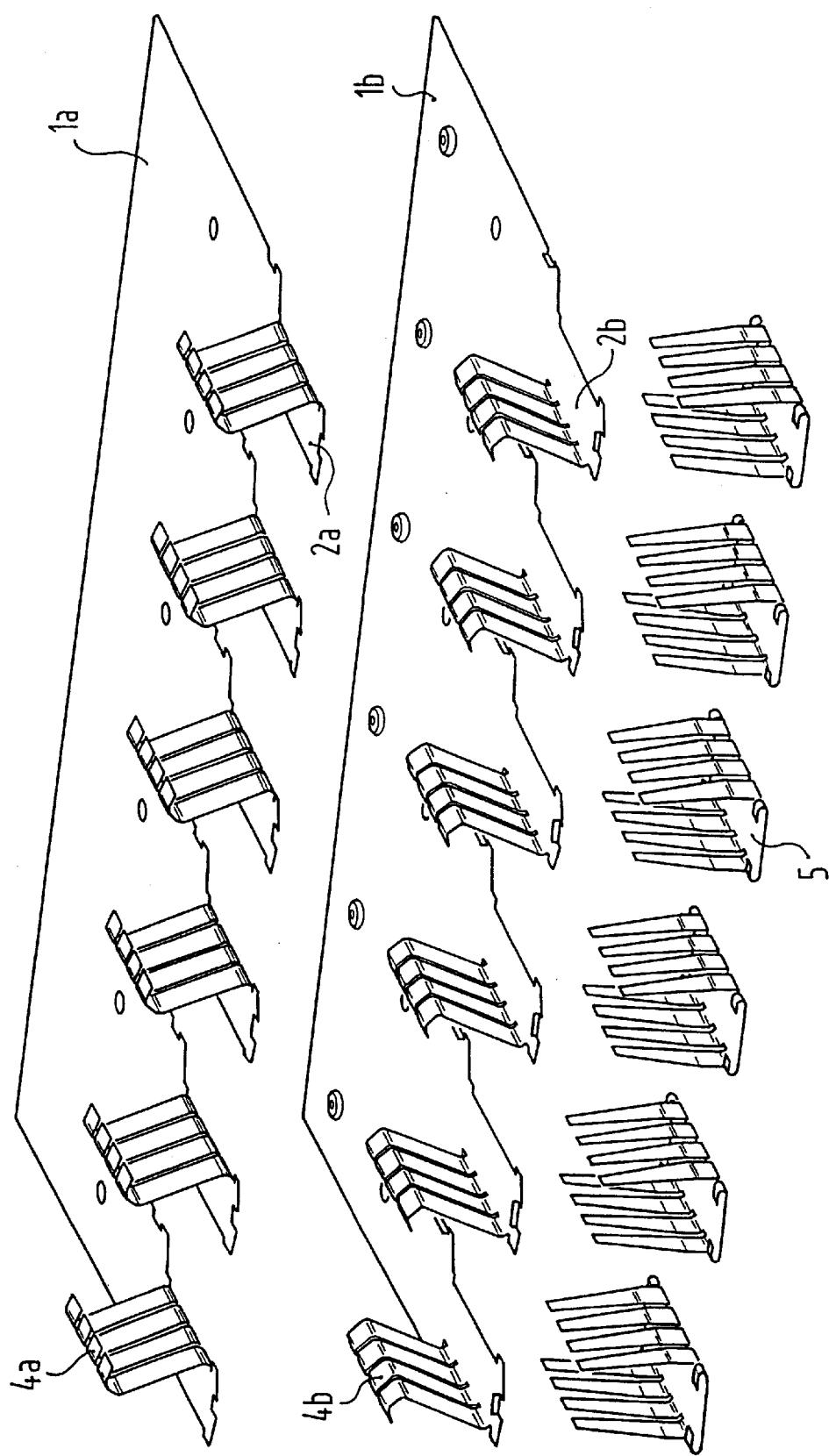
FIG. 3 shows an exploded view of the bus bar from FIG. 1.

FIG. 3 shows the components of the bus bar according to the invention. The bus bar 1 consists of the upper layer 1a, with flat tabs 2a, from which the elastic arms 4a extend almost vertically with respect to the layer 1a. This layer 1a is placed on the layer 1b, which, in turn, has flat tabs 2b with the elastic arms 4b. The two layers 1a and 1b of the bus bar 1 are at present fixed together pressing the applicator spring 5 to the elastic arms 4. It is thus possible to secure a very simple process of manufacture of the bus bar according to the invention. It is not absolutely necessary to envisage welding or brasing of the two layers 1a and 1b, nor the applicator of joining rivets.

Figure 4:
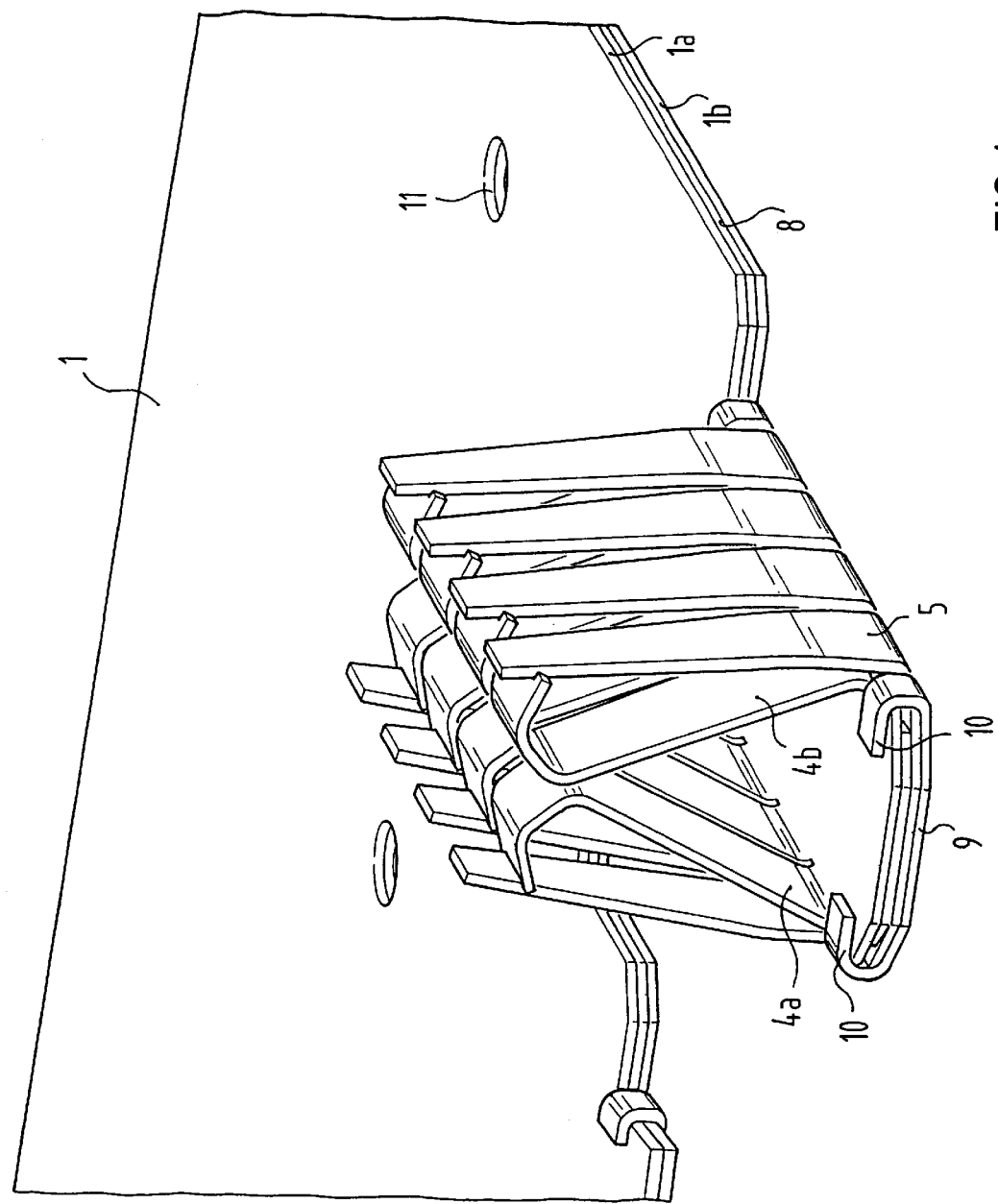
FIG. 4 is a detailed view of a second embodiment form according to the invention of the bus bar.

FIG. 4 shows a second form of embodiment according to the invention of the bus bar 1. This form of embodiment differs from the form of embodiment shown in FIG. 1 and 3, by reason of the fact that the two layers 1a and 1b are interconnected by means of an adhesive plate 8, which is usually non-conducting. The bus bar is therefore at the same potential, due to the fact that the applicator spring 5, which usually is electrically conducting, is in contact with the two contact arms 4a and 4b. Moreover, the applicator spring 5, which comprises a connection plate 9, is connected by means of lugs 10 to the connector plug socket, which consists of the pair of elastic arms 4a and 4b. It is moreover possible to make an electricity-conducting connection by the openings 11 provided in the bus bar 1, openings into which it is possible to insert rivets. These openings 11 can also be used to fix the bus bar into a housing.

Figure 5:
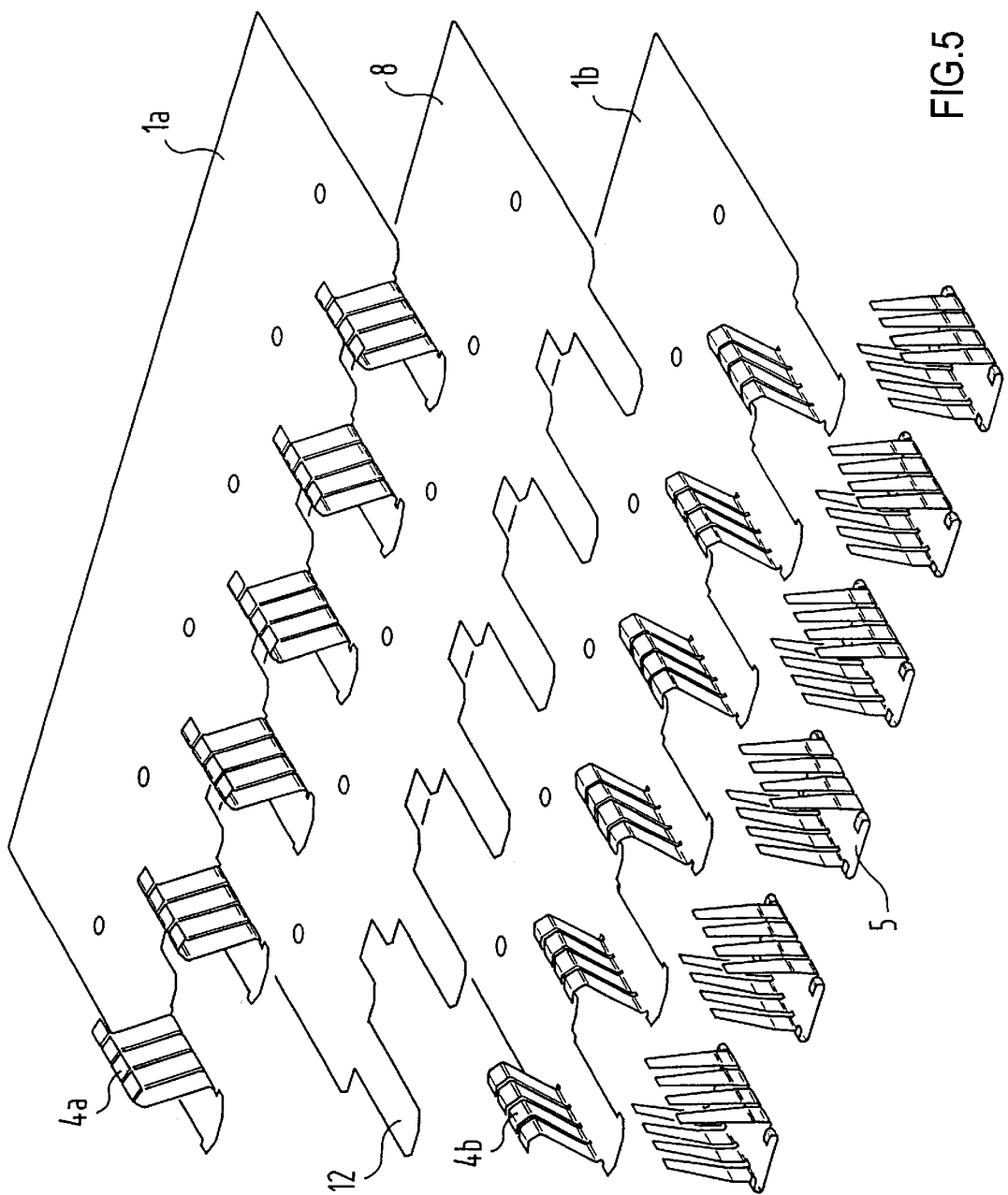
FIG. 5 is an exploded view of the bus bar from FIG. 4.

FIG. 5 again shows the different components of the bus bar according to the second form of embodiment of the invention, the sticky adhesive plate being, as shown, placed between the two layers 1a and 1b of the bus bar 1. The adhesive plate 8 also has, at its front end, flat tabs 12, which place themselves between the flat tabs 2a and 2b.

Thanks to the present invention, a bus bar is obtained, the process of manufacture of which is simple, making it possible to pass strong currents and where heating up caused by the passage of high intensity current is minimised. Similarly, in the case of the present bus bar, the number of connector plug sockets can be increased, owing to the fact that the spacing between the connector plug sockets 3 can be smaller than when the contact bars are made in one layer. The bus bar is usually made by the process of die stamping from a steel sheet blank, the elastic arms 4a and 4b being folded back laterally and upward. If the elastic arms 4a and 4b are formed in one piece onto a flat tab, more space will be needed between the flat tabs than that which is now occupied, when only a part of the pair of contact arms 4a and 4b is formed in one piece onto each flat tab. For this reason, it is possible to increase the density of the connector plug sockets in opposition to that of classical contact bars.

What is claimed is:

1. A bus bar, laterally equipped with flat tabs laterally formed in one piece, (of the comb type), having connector plug sockets, the connection plug sockets each comprising at least one pair of elastic arms destined to receive a mating supplementary contact and an applicator spring, characterised by the fact that the bus bar is made from upper and lower layers each layer having at least one of said flat tabs extending outward therefrom and in that one arm of said pair of elastic arms is formed in one piece onto said at least one of said flat tabs of the bus bar.

2. A bus bar according to claim 1, wherein one of said at least one flat tabs of said lower level and one of said at least one flat tabs of said upper level overlap to constitute a bottom plate of the connector plug socket.

3. A bus bar according to claim 1, wherein the two elastic arms of said pair of elastic arms are inclined towards one another from the bottom plate and then continue in the form of a funnel.

4. A bus bar according to claim 1, wherein the applicator spring has a number of elastic arms corresponding to the number of pairs of elastic arms.

5. A bus bar according to claim 1, wherein the applicator spring has a connecting plate equipped with lugs, with the aid of which the two flat tabs of a respective connector plug socket are connected together and with the aid of which the applicator spring is connected to a respective pair of the elastic arms.

6. A bus bar according to claim 1, wherein one of said two layers has, on the outside of the connector plug socket, lugs with the aid of which said two layers of the bus bar are interconnected.

7. A bus bar according to claim 1, wherein the two layers of the bus bar are arranged essentially in parallel.

8. A bus bar according to claim 1, wherein the two layers of the bus bar are interconnected without brasing and/or welding.

9. A bus bar according to claim 1, wherein the two layers of the bus bar are interconnected by means of an adhesive plate arranged between the two layers.

* * * * *